United States Patent
Noguchi

(10) Patent No.: US 11,435,477 B2
(45) Date of Patent: Sep. 6, 2022

(54) DISTANCE MEASUREMENT BASED ON DIFFERENCE OF TWO BEAT SIGNALS GENERATED FROM SAME REFERENCE LIGHT

(71) Applicant: NEC Corporation, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 11 days.

(21) Appl. No.: 16/982,021

(22) PCT Filed: Mar. 28, 2018

(86) PCT No.: PCT/JP2018/012785
§ 371 (c)(1),
(2) Date: Sep. 17, 2020

(87) PCT Pub. No.: WO2019/186776
PCT Pub. Date: Oct. 3, 2019

(65) Prior Publication Data
US 2021/0018626 A1      Jan. 21, 2021

(51) Int. Cl.
*G01B 9/02*      (2022.01)
*G01S 17/34*      (2020.01)
*G01B 9/02003*      (2022.01)

(52) U.S. Cl.
CPC .......... *G01S 17/34* (2020.01); *G01B 9/02003* (2013.01)

(58) Field of Classification Search
CPC ...... G01S 17/34; G01S 7/491; G01B 9/02003
See application file for complete search history.

(56) References Cited

U.S. PATENT DOCUMENTS

| 4,830,486 A | 5/1989 | Goodwin |
| 5,818,588 A * | 10/1998 | Matsumoto ........ G01B 9/02007 356/487 |
| 2012/0251032 A1 | 10/2012 | Kato |

(Continued)

FOREIGN PATENT DOCUMENTS

| DE | 102013211846 A1 | 12/2014 |
| JP | S 63-154922 A | 6/1988 |
| JP | H6-186337 A | 7/1994 |

(Continued)

OTHER PUBLICATIONS

International Search Report dated Jun. 26, 2018, in corresponding PCT International Application.

(Continued)

*Primary Examiner* — Hwa Andrew Lee

(57) ABSTRACT

A distance measurement device (2000) generates transmission light by modulating an optical carrier wave. The distance measurement device (2000) transmits the generated transmission light, and receives reflected light acquired by the transmission light being reflected by a measured object (10). The distance measurement device (2000) generates a first beat signal by causing the transmission light to interfere with reference light. The distance measurement device (2000) generates a second beat signal by causing the reflected light to interfere with the reference light. The distance measurement device (2000) calculates a distance to the measured object (10), based on a difference between the first beat signal and the second beat signal.

6 Claims, 14 Drawing Sheets

(56) References Cited

U.S. PATENT DOCUMENTS

2014/0044434 A1 2/2014 Hashimoto
2015/0331109 A1* 11/2015 Christensen .......... G01S 7/4808
356/4.1

FOREIGN PATENT DOCUMENTS

| JP | 2006-003127 A | 1/2006 |
|----|---------------|--------|
| WO | WO 2011/043079 A1 | 4/2011 |
| WO | WO 2012/132374 A1 | 10/2012 |
| WO | 2015/108587 A2 | 7/2015 |

OTHER PUBLICATIONS

Extended European Search Report for EP Application No. EP18912872.1 dated Feb. 24, 2021.

* cited by examiner

DISTANCE MEASUREMENT BASED ON DIFFERENCE OF TWO BEAT SIGNALS GENERATED FROM SAME REFERENCE LIGHT

CROSS-REFERENCE TO RELATED PATENT APPLICATIONS

This application is a National Stage Entry of International Application No. PCT/JP2018/012785, filed Mar. 28, 2018. The entire contents of the above-referenced application are expressly incorporated herein by reference.

TECHNICAL FIELD

The present invention relates to a distance measurement device.

BACKGROUND ART

A distance measurement device that performs distance measurement by using a light wave has been developed. The distance measurement device that uses a light wave performs distance measurement by transmitting predetermined transmission light from the distance measurement device, receiving reflected light acquired by the transmission light being reflected by a measured object, and analyzing the reflected light. PTL 1 discloses a technique of transmitting distance measurement light having an amplitude modulated to a measured object, and performing distance measurement based on a phase difference between received reflected light and transmission light.

RELATED DOCUMENT

Patent Document

[PTL 1] Japanese Patent Application Publication No. 2006-3127

SUMMARY OF THE INVENTION

Technical Problem

The present inventor has found a new technique for performing distance measurement by using a light wave. One of objects of the present invention is to provide a new technique for performing distance measurement by using a light wave.

Solution to Problem

A distance measurement device according to the present invention includes 1) a distance measurement signal generation means for generating a distance measurement signal, 2) a modulation means for generating transmission light acquired by modulating a frequency of an optical carrier wave, based on the distance measurement signal, 3) a transmission means for transmitting the generated transmission light, 4) a reception means for receiving reflected light being light acquired by the transmission light being reflected by a measured object, 5) a first beat signal generation means for generating a first beat signal by causing the transmission light to interfere with reference light, 6) a second beat signal generation means for generating a second beat signal by causing the reflected light to interfere with reference light, and 7) a calculation means for calculating a distance to the measured object, based on a difference between the first beat signal and the second beat signal.

A control method according to the present invention is a control method executed by a computer. The control method includes 1) a distance measurement signal generation step of generating a distance measurement signal, 2) a modulation step of generating transmission light acquired by modulating a frequency of an optical carrier wave, based on the distance measurement signal, 3) a transmission step of transmitting the generated transmission light, (4) a reception step of receiving reflected light being light acquired by the transmission light being reflected by a measured object, 5) a first beat signal generation step of generating a first beat signal by causing the transmission light to interfere with reference light, 6) a second beat signal generation step of generating a second beat signal by causing the reflected light to interfere with reference light, and 7) a calculation step of calculating a distance to the measured object, based on a difference between the first beat signal and the second beat signal.

Advantageous Effects of Invention

The present invention provides a new technique for performing distance measurement by using a light wave.

BRIEF DESCRIPTION OF THE DRAWINGS

The above-described object, the other objects, features, and advantages will become more apparent from suitable example embodiments described below and the following accompanying drawings.

DESCRIPTION OF EMBODIMENTS

Figure 1:
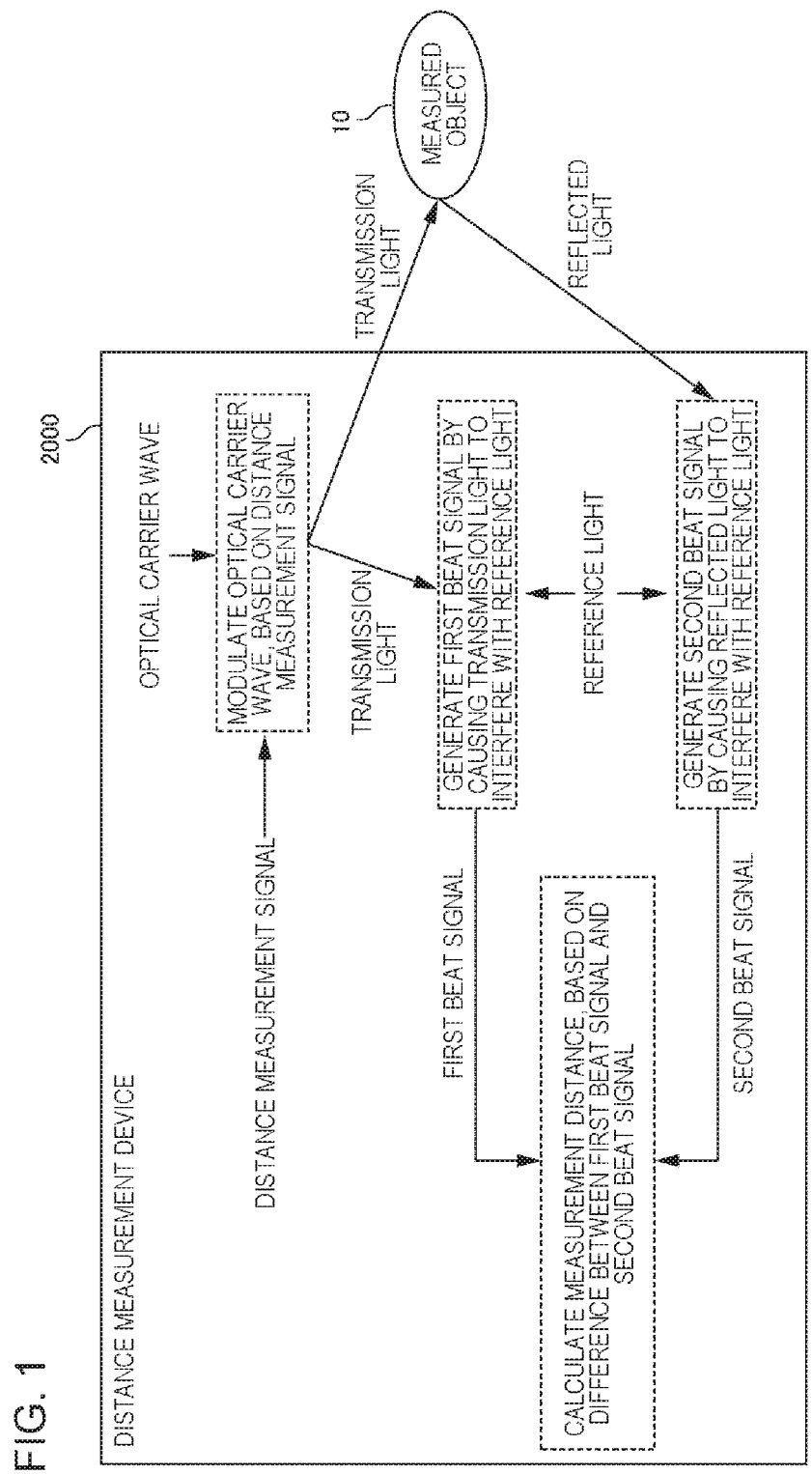
FIG. 1 is a diagram schematically illustrating an operation of a distance measurement device according to an example embodiment 1.

Hereinafter, example embodiments of the present invention will be described with reference to the drawings. Note that, in all of the drawings, the same components have the same reference numerals, and description thereof will be appropriately omitted. Further, in each block diagram, each block represents a configuration of a functional unit instead of a configuration of a hardware unit unless otherwise described.

Example Embodiment 1

<Outline>

FIG. 1 is a diagram schematically illustrating an operation of a distance measurement device 2000 according to an example embodiment 1. Note that FIG. 1 is an illustrative diagram for a purpose of facilitating understanding of the operation of the distance measurement device 2000, and the operation of the distance measurement device 2000 is not limited by FIG. 1 at all.

The distance measurement device 2000 is a device that performs measurement of a distance (distance measurement) from the distance measurement device 2000 to a measured object 10 by using a light wave. In general, in distance measurement using a light wave, calculation of a distance is performed by transmitting transmission light acquired by modulating a light wave (hereinafter, an optical carrier wave) being a carrier wave with a distance measurement signal, receiving reflected light acquired by the transmission light being reflected by an object being a distance measurement target, and analyzing the reflected light.

The distance measurement device 2000 generates transmission light by generating a distance measurement signal, and modulating an optical carrier wave, based on the generated distance measurement signal. The distance measurement device 2000 transmits the generated transmission light, and receives reflected light acquired by the transmission light being reflected by the measured object 10.

The distance measurement device 2000 generates a beat signal by causing the transmission light to interfere with reference light. The beat signal is referred to as a first beat signal. Further, the distance measurement device 2000 generates another beat signal by causing the reflected light to interfere with the reference light. The beat signal is referred to as a second beat signal. Then, the distance measurement device 2000 calculates a distance to the measured object 10, based on a difference between the first beat signal and the second beat signal. Note that the reference light is an optical carrier wave, or local light from a light source being separately disposed.

<Action and Effect>

The distance measurement device 2000 provides a new distance measurement technique of calculating a distance to a measured object, based on a difference between two beat signals that are the first beat signal acquired by causing transmission light and reference light to interfere with each other and the second beat signal acquired by causing reflected light and the reference light to interfere with each other.

Hereinafter, the present example embodiment will be described in more detail.

<Example of Functional Configuration of Distance Measurement Device 2000>

Figure 2:
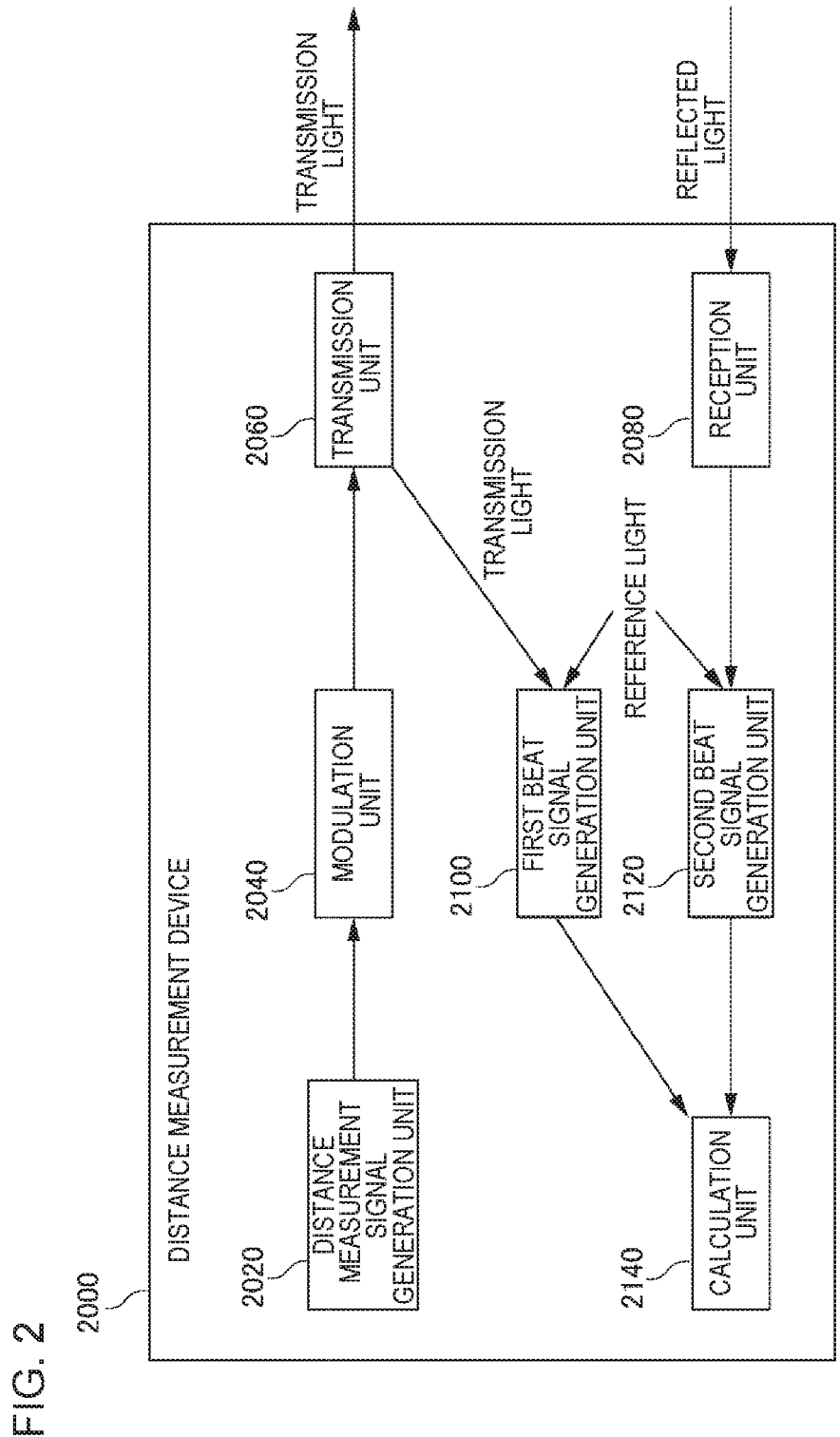
FIG. 2 is a diagram illustrating a functional configuration unit of the distance measurement device.

FIG. 2 is a diagram illustrating a functional configuration unit of the distance measurement device 2000. The distance measurement device 2000 includes a distance measurement signal generation unit 2020, a modulation unit 2040, a transmission unit 2060, a reception unit 2080, a first beat signal generation unit 2100, a second beat signal generation unit 2120, and a calculation unit 2140. The distance measurement signal generation unit 2020 generates a distance measurement signal. The modulation unit 2040 generates transmission light acquired by modulating a frequency of an optical carrier wave, based on the distance measurement signal. The transmission unit 2060 transmits the generated transmission light. The reception unit 2080 receives reflected light being light acquired by the transmission light being reflected by the measured object 10. The first beat signal generation unit 2100 generates the first beat signal by causing the reflected light to interfere with the transmission light. The second beat signal generation unit 2120 generates the second beat signal by causing the reflected light to interfere with the reference light. The calculation unit 2140 calculates a distance to the measured object 10, based on the first beat signal and the second beat signal.

<Example of Hardware Configuration>

Figure 3:
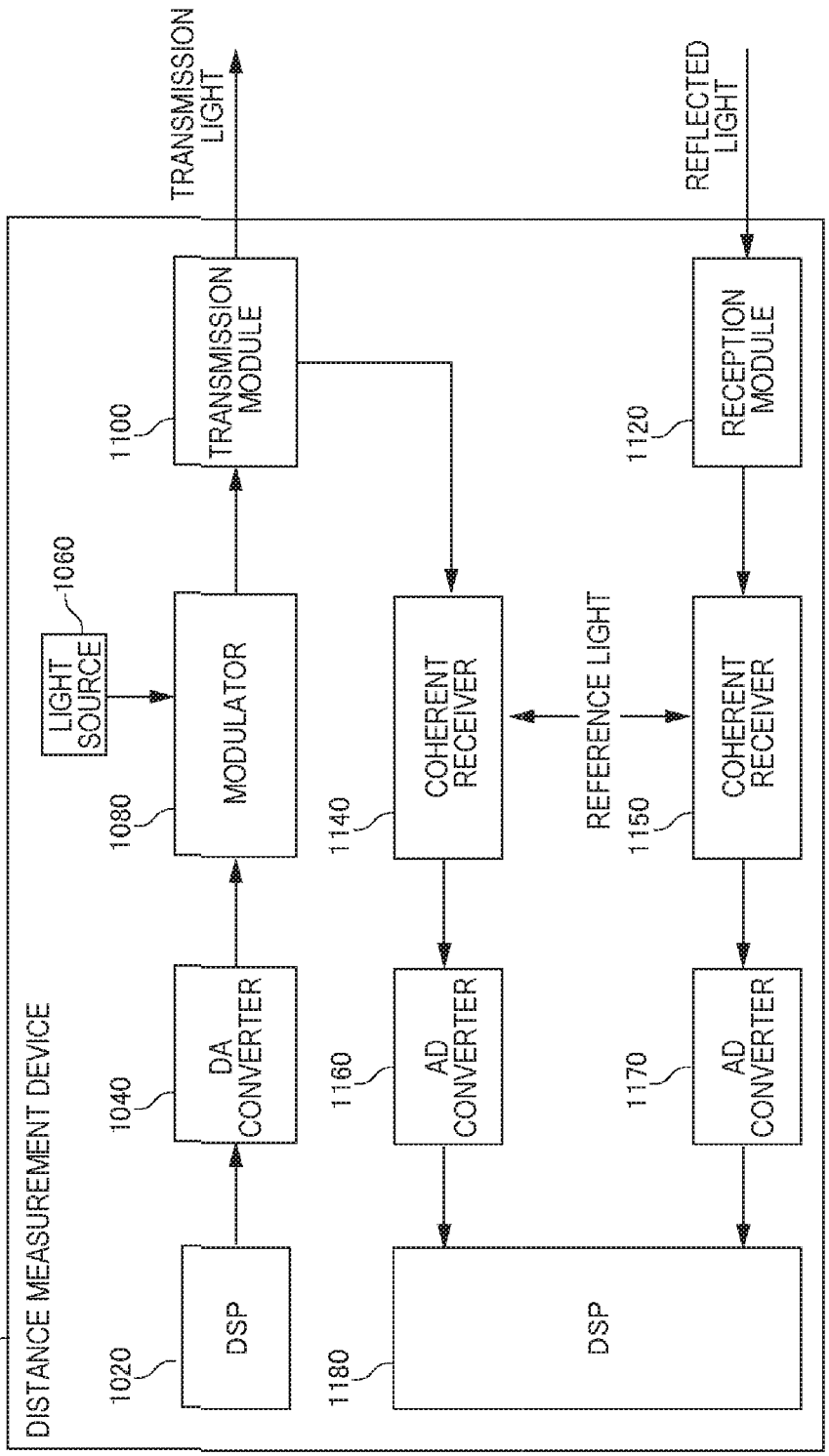
FIG. 3 is a diagram illustrating a hardware configuration of the distance measurement device.

FIG. 3 is a diagram illustrating a hardware configuration of the distance measurement device 2000. The distance measurement device 2000 in FIG. 3 includes a digital signal processor (DSP) 1020, a digital-analog (DA) converter 1040, a light source 1060, a modulator 1080, a transmission module 1100, a reception module 1120, a coherent receiver 1140, a coherent receiver 1150, an analog-digital (AD) converter 1160, an analog-digital converter 1170, and a digital signal processor 1180.

The digital signal processor 1020 is a processor that achieves the distance measurement signal generation unit 2020. The digital signal processor 1020 outputs a digital signal representing a distance measurement signal. The distance measurement signal output from the digital signal processor 1020 is converted into an analog electric signal by the digital-analog converter 1040. Herein, information (such as a parameter that defines a distance measurement signal) for generating a distance measurement signal is stored in advance in a storage device that can be accessed from the digital signal processor 1020. The digital signal processor 1020 generates a distance measurement signal according to the information read from the storage device.

The modulator 1080 is a modulator that achieves the modulation unit 2040. For example, the modulator 1080 is a quadrature modulator achieved by a Mach-Zehnder optical modulator and the like. However, modulation performed by the modulation unit 2040 is not limited to quadrature modulation, and the modulator 1080 is not limited to a quadrature modulator.

The light source 1060 is any light source that outputs an optical carrier wave. For example, when laser light is used as transmission light, the light source 1060 is achieved by a laser oscillator and the like. The modulator 1080 performs modulation on an optical carrier wave output from the light source 1060, based on a distance measurement signal. More specifically, the modulator 1080 modulates an optical carrier wave output from the light source 1060 by using an analog signal output from the digital-analog converter 1040.

The transmission module 1100 is a module that achieves the transmission unit 2060. The transmission module 1100 is formed of an optical system (such as a lens) for outputting transmission light to an outside of the distance measurement device 2000, and an optical system (such as a mirror) for controlling an output direction of transmission light.

The reception module 1120 is a module that achieves the reception unit 2080. The reception module 1120 is formed of an optical system (such as a lens and a mirror) for taking reflected light into the distance measurement device 2000.

The coherent receiver 1140 is a hardware element that achieves the first beat signal generation unit 2100. For example, the coherent receiver 1140 is formed of an optical coherent mixer that generates an optical beat signal by mixing transmission light and reference light and a balanced receiver that performs photoelectric conversion on the optical beat signal, and thus outputs an analog electric signal corresponding to the optical beat signal of the transmission light and the reference light. Hereinafter, an analog electric signal (namely, an electric signal acquired by performing photoelectric conversion on an optical beat signal) output from the coherent receiver 1140 is expressed as a "first analog beat signal".

A configuration of the coherent receiver 1140 is not limited to the above-mentioned configuration. For example, the coherent receiver 1140 may be configured to perform quadrature reception by a quadrature receiver. In this case, more specifically, the coherent receiver 1140 includes an IQ mixer (90-degree hybrid) and two balanced receivers.

The coherent receiver 1150 is a hardware element that achieves the second beat signal generation unit 2120. A configuration of the coherent receiver 1150 is similar to that of the coherent receiver 1140 except for a point that reflected light instead of transmission light is input. Note that an analog electric signal (namely, an electric signal acquired by performing photoelectric conversion on an optical beat signal) output from the coherent receiver 1150 is expressed as a "second analog beat signal".

Figure 4:
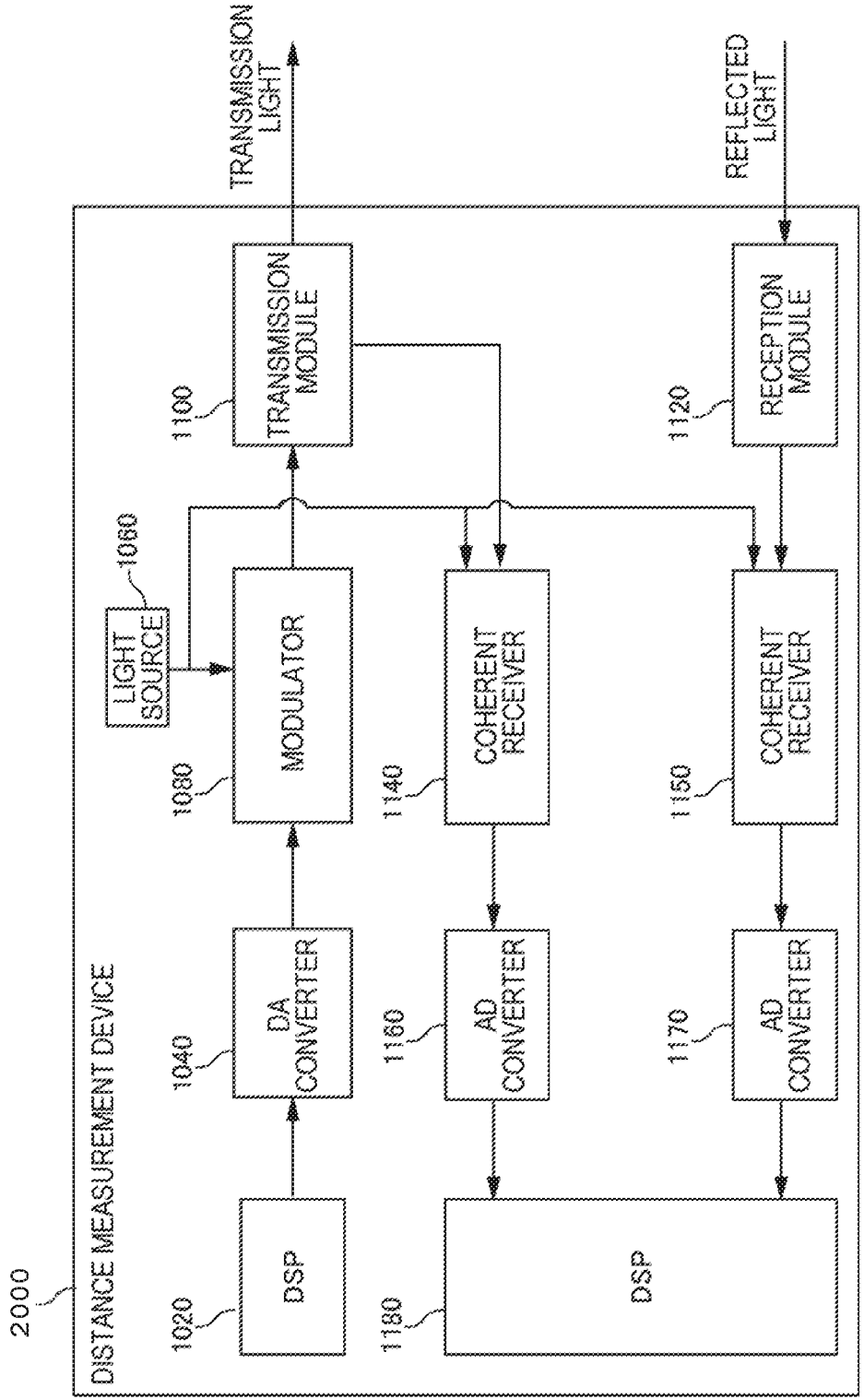
FIG. 4 is a diagram illustrating a variation of reference light.
Figure 5:
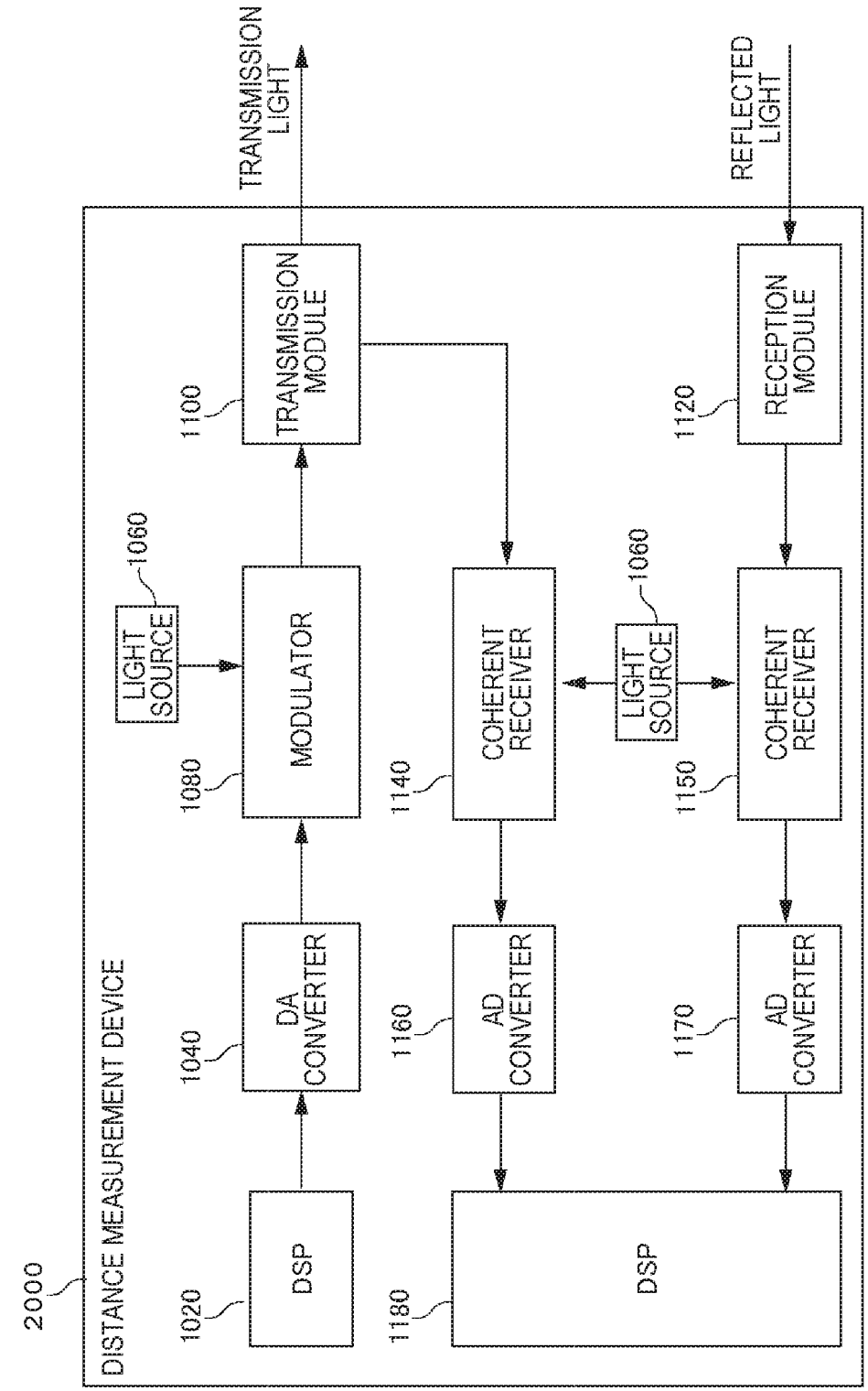
FIG. 5 is a diagram illustrating a variation of reference light.

For reference light input to the coherent receiver 1140 and the coherent receiver 1150, 1) an optical carrier wave output from the light source 1060, 2) local light output from another light source being separately provided, and the like can be used. FIGS. 4 and 5 are a diagram illustrating a variation of the reference light. FIGS. 4 and 5 illustrate cases of 1) and 2) described above, respectively. In FIG. 4, for example, a splitter or the like is provided on a portion that splits an optical carrier wave output from the light source 1060 into a plurality of paths (not illustrated). Herein, a configuration may be adopted such that a switch mechanism for causing the exemplified reference light of two kinds to be selectively input to the reception unit 2080 is provided, and either of the two beams of reference light can be appropriately used by switching of the switch (not illustrated).

The first analog beat signal output from the coherent receiver 1140 is input to the analog-digital converter 1160. The first analog beat signal is converted into a digital signal by the analog-digital converter 1160. Hereinafter, a digital signal acquired by converting the first analog beat signal into a digital signal is expressed as a "first digital beat signal". Note that, when the coherent receiver 1140 is constituted as a quadrature receiver, two analog-digital converters 1160 are provided, and the first analog beat signal of each of an in-phase component and a quadrature component of reflected light is converted into a digital signal.

The second analog beat signal output from the coherent receiver 1150 is input to the analog-digital converter 1170. The second analog beat signal is converted into a digital signal by the analog-digital converter 1170. Hereinafter, a digital signal acquired by converting the second analog beat signal into a digital signal is expressed as a "second digital beat signal". Note that, when the coherent receiver 1150 is constituted as a quadrature receiver, two analog-digital converters 1170 are provided, and the second analog beat signal of each of an in-phase component and a quadrature component of reflected light is converted into a digital signal.

The digital signal processor 1180 is a processor that achieves the calculation unit 2140. The first digital beat signal output from the analog-digital converter 1160 and the second digital beat signal output from the analog-digital converter 1170 are input to the digital signal processor 1180. The digital signal processor 1180 calculates a distance to the measured object 10 by analyzing the first digital beat signal and the second digital beat signal. Note that, when the coherent receiver 1140 and the coherent receiver 1150 are constituted as a quadrature receiver, the digital signal processor 1180 calculates a distance to the measured object 10 by analyzing a complex signal represented by a group of the first digital beat signal of an in-phase component and the first digital beat signal of a quadrature component, and a complex signal represented by a group of the second digital beat signal of an in-phase component and the second digital beat signal of a quadrature component.

The calculation unit 2140 may further include a compensation circuit for compensating for an aberration of an optical system, incompletion of an analog electric circuit characteristic included in transmission/reception, and the like with respect to a digital signal output from an analog-digital converter (not illustrated). For example, an existing technique can be used for achieving the compensation circuit.

<Flow of Processing>

Figure 6:
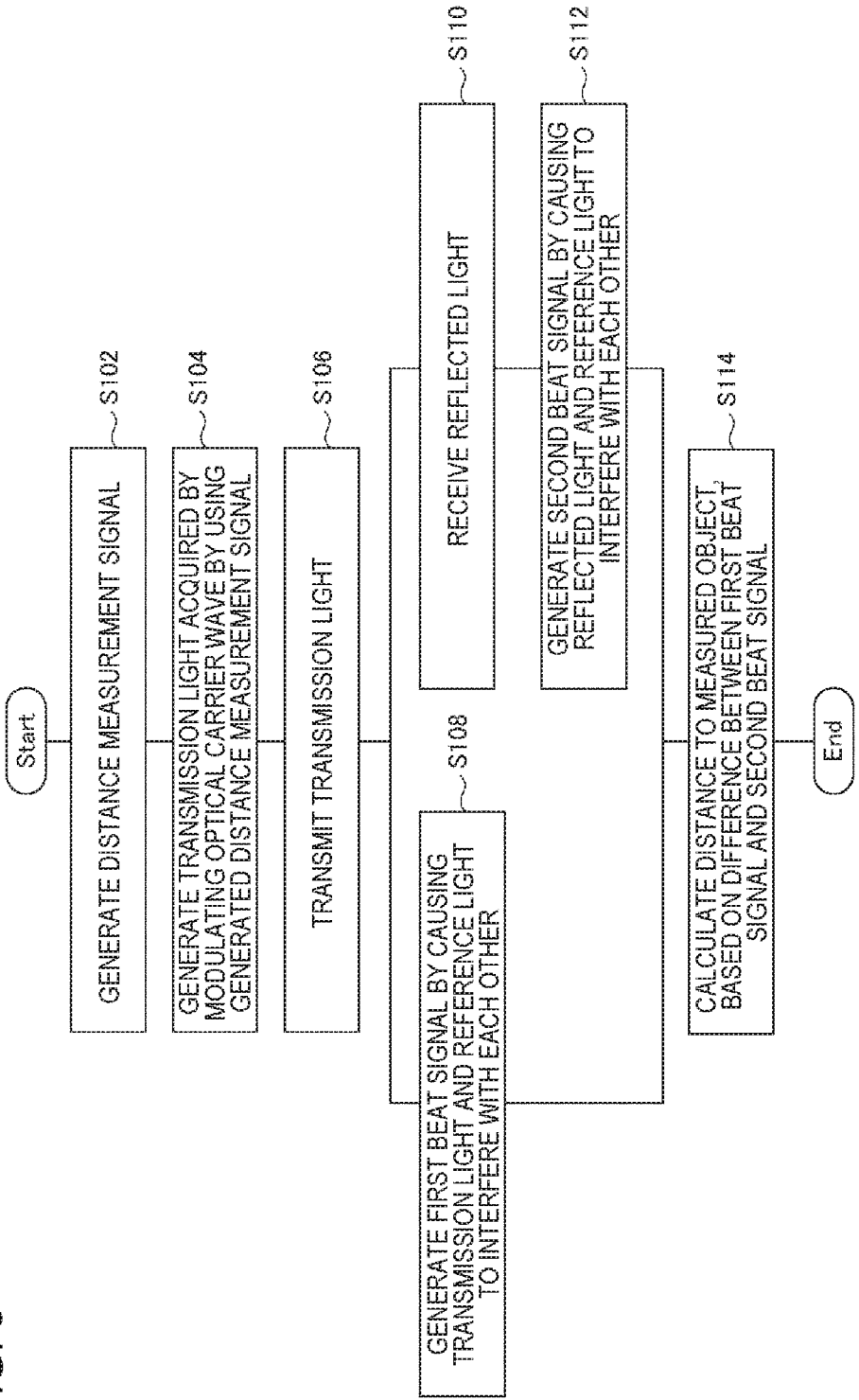
FIG. 6 is a flowchart illustrating a flow of processing performed by the distance measurement device.

FIG. 6 is a flowchart illustrating a flow of processing performed by the distance measurement device 2000. The generation unit 2020 generates a distance measurement signal (S102). The modulation unit 2040 generates transmission light acquired by modulating an optical carrier wave, by using the generated distance measurement signal (S104). The transmission unit 2060 transmits the generated transmission light (S106).

The first beat signal generation unit 2100 generates a first beat signal by causing the transmission light and reference light to interfere with each other (S108). The reception unit 2080 receives reflected light acquired by the transmission light being reflected by the measured object 10 (S110). The second beat signal generation unit 2120 generates a second beat signal by causing reflection light and the reference light to interfere with each other (S112).

The calculation unit 2140 calculates a distance to the measured object 10, based on a difference between the first beat signal and the second beat signal (S114).

<Detailed Description for Each Distance Measurement Method>

The distance measurement device 2000 can use various distance measurement methods. Hereinafter, an operation of the distance measurement device 2000 will be described in more detail for each distance measurement method used by the distance measurement device 2000.

<Phase Difference Detection Method>

In a phase difference detection method, a distance to a measurement target is calculated by using a phase difference between transmission light and reflected light. Herein, the modulation unit 2040 shifts a frequency of an optical carrier wave by a predetermined amount in order to achieve heterodyne reception in the reception unit 2080. Herein, it is assumed that a frequency of the optical carrier wave is fc, and transmission light is generated by shifting the frequency to fs=fc+fm1 by fm1. Note that an existing technique can be used as a specific technique for shifting a frequency of an optical signal.

Figure 7:
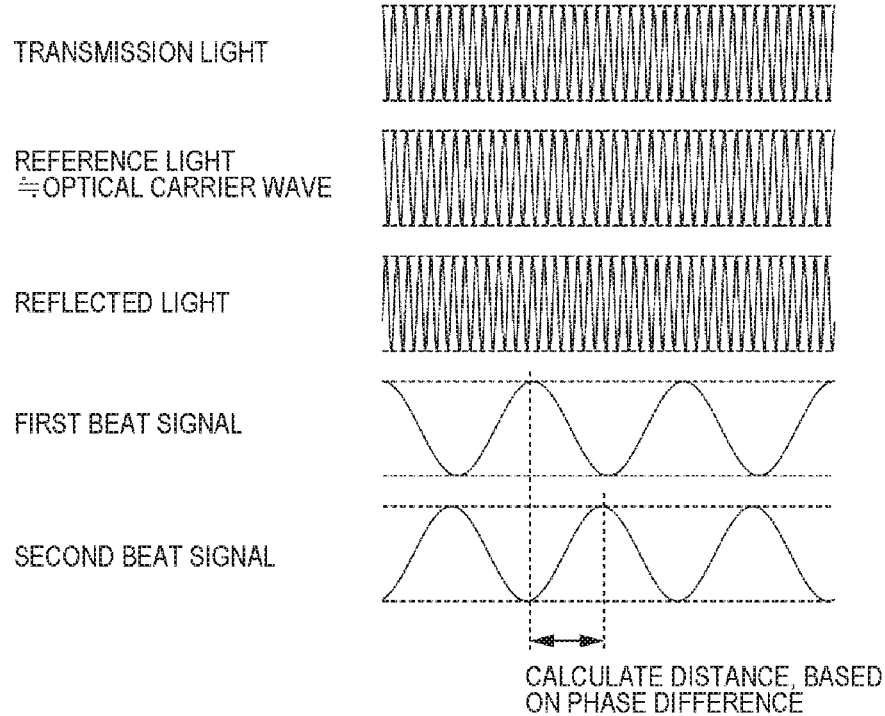
FIG. 7 is a diagram schematically illustrating transmission light, reference light, reflected light, and digital beat signals in a phase difference detection method.

FIG. 7 is a diagram schematically illustrating transmission light, reference light, reflected light, and digital beat signals in the phase difference detection method. Since a frequency of light is originally extremely high and it is difficult to accurately illustrate the frequency as a wave, the frequency herein is represented as a wave in a slow cycle for the sake of convenience in such a way that the frequency of the light can be imagined. The same also applies to each of the drawings described below.

The first beat signal generation unit 2100 performs the heterodyne reception by causing transmission light and reference light to interfere with each other, and generates a first beat signal. The second beat signal generation unit 2120 performs the heterodyne reception by causing reflected light and the reference light to interfere with each other, and generates a second beat signal. Herein, a frequency of the digital beat signal is fs−fc (=fm1). In this method, an optical carrier wave, or local light corresponding to the optical carrier wave is used as the reference light.

The calculation unit 2140 detects a phase difference between the first beat signal and the second beat signal. The phase difference corresponds to a phase difference between the transmission light and the reflected light. The calculation unit 2140 calculates time (flight time of the transmission light) required for light to make a round-trip between the distance measurement device 2000 and the measured object 10, based on the detected phase difference. Then, the calculation unit 2140 calculates a distance from the distance measurement device 2000 to the measured object 10, based on the calculated time. Note that an existing technique can be used as a technique for specifying flight time of transmission light from a phase difference between the transmission light and reflected light.

Herein, in a prior art (see PTL 1) that performs distance measurement by using a phase difference, an amplitude of an optical wave is modulated. In contrast, in the above-described method, by using transmission light generated by modulating a frequency of an optical carrier wave, the distance measurement device 2000 performs distance measurement, based on a phase difference between the transmission light and reflected light. The transmission light acquired by modulating a frequency of the optical carrier wave is less likely to be affected by amplitude noise than the transmission light acquired by modulating an amplitude of the optical carrier wave. Thus, the distance measurement device 2000 can achieve highly accurate distance measurement that is less likely to be affected by amplitude noise in the method of calculating a measurement distance, based on a phase difference between transmission light and reflected light.

Note that, when transmission light generated by amplitude modulation is used, a phase difference between the transmission light and reflected light can be easily detected based on a difference in amplitude between the transmission light and the reflected light. On the other hand, when a phase difference of an optical carrier wave itself described in the present example embodiment is detected, a phase fluctuates due to phase noise of the optical carrier wave being a transmission light source, and thus it is not easy to detect an accurate phase.

Thus, the distance measurement device 2000 compares the first beat signal acquired by causing transmission light and reference light to interfere with each other with the second beat signal acquired by causing reflected light and the reference light to interfere with each other. By detecting each of phase differences with reference to the same reference light, the phase differences can be detected even without a difference in amplitude between the transmission light and the reflected light. In other words, a phase difference between the transmission light and the reflected light can be detected without modulating an amplitude of an optical carrier wave.

Note that, although a comparison is made with the same reference light, for reference light input to the first beat signal generation unit 2100 and the second beat signal generation unit 2120, beams of reference light acquired by being split by using a splitter and the like need to be input, and thus, strictly speaking, a difference is generated in optical path length between the beams of reference light. Therefore, there is a possibility that some sort of phase difference may be generated between the reference light input to the first beat signal generation unit 2100 and the reference light input to the second beat signal generation unit 2120, but the phase difference due to a manufacturing variation of an optical component during manufacturing of an apparatus and a device is dominant and does not fluctuate. Thus, for example, the problem is solved by performing calibration in such a way as to measure the phase difference in advance by a shipment test and the like and compensate for the difference, and the like.

Figure 8:
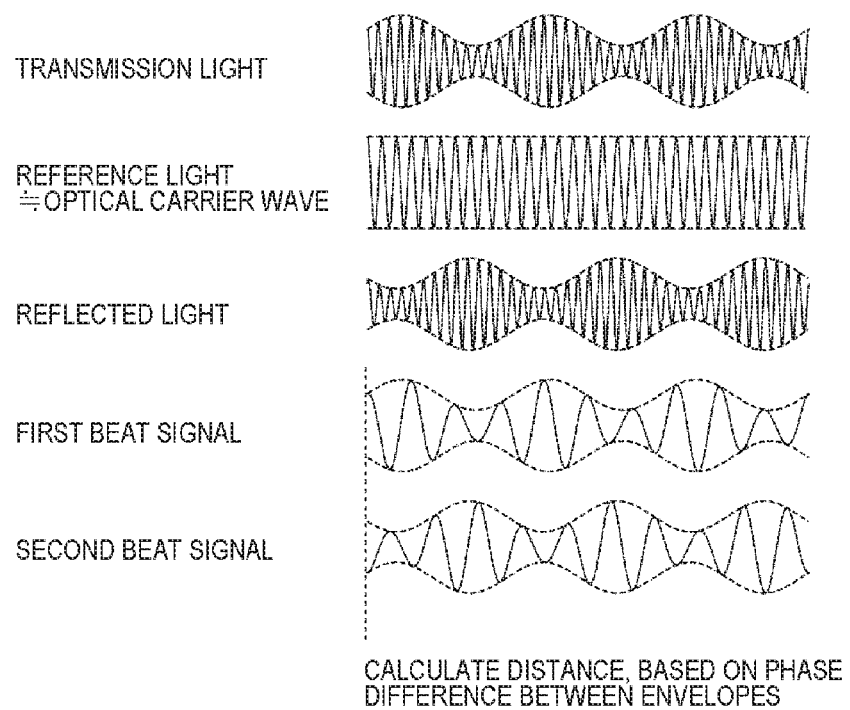
FIG. 8 is a diagram schematically illustrating a case where a frequency and an amplitude of an optical carrier wave are modulated in the phase difference detection method.

However, even when the phase difference detection method is adopted, the distance measurement device 2000 may generate transmission light by also modulating an amplitude in addition to a frequency of an optical carrier wave. FIG. 8 is a diagram schematically illustrating a method of modulating a frequency and an amplitude of an optical carrier wave in the phase difference detection method. In FIG. 8, the optical carrier wave is modulated in such a way that a frequency is shifted from fc to fc+fm1 and an amplitude fluctuates at a frequency of fm2. The optical carrier wave or local light corresponding to the optical carrier wave is used as reference light.

When transmission light is modulated in such a manner, beat signals generated by the first beat signal generation unit 2100 and the second beat signal 2120 have intensity of an envelope thereof changed at the frequency of fm2. Thus, the calculation unit 2140 analyzes the first beat signal and the second beat signal, and detects the envelope of each of the first beat signal and the second beat signal. Then, the calculation unit 2140 detects a phase difference between the envelopes of the first beat signal and the second beat signal. The phase difference corresponds to a phase difference between the transmission light and the reflected light. Then, the calculation unit 2140 calculates a distance from the distance measurement device 2000 to the measured object 10, based on the phase difference.

Further, in this way, when a phase comparison between envelopes of beat signals, namely, intensity signals of beat signals is performed, an envelope signal may be detected by using a direct detection method of directly detecting light intensity with a photodiode instead of coherent detection that performs reception by causing reference light to interfere. In this case, although resistance to noise in an amplitude direction decreases, there are advantages that an optical interference system and the like are unnecessary and a configuration of an optical receiver can be simplified, as compared to the coherent detection.

<ToF Method>

In a ToF method, a distance to a measurement target is calculated based on flight time of light. When the ToF method is used, transmission light is generated by modulating an optical carrier wave in such a way as to change a part of the optical carrier wave on a time axis. An element of the optical carrier wave to be changed may be intensity (amplitude), may be a frequency, and may be a phase.

<<Case of Modulating Intensity>>

Figure 9:
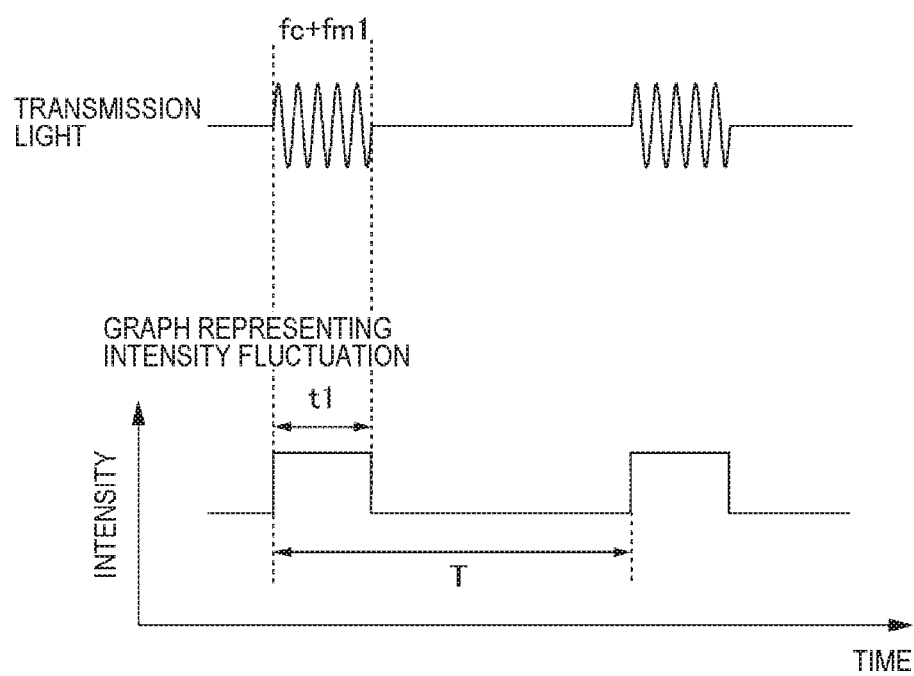
FIG. 9 is a diagram schematically illustrating a method of modulating intensity of an optical carrier wave in a ToF method.

FIG. 9 is a diagram schematically illustrating a method of modulating intensity of an optical carrier wave in the ToF method. An upper row illustrates transmission light, and a lower row illustrates a state of an intensity fluctuation performed on the transmission light. Herein, it is assumed that a frequency of the optical carrier wave is fc. As illustrated, the transmission light in the ToF method using intensity modulation is a pulse signal having a pulse width of t1 and a cycle of T. Further, for the heterodyne reception, the modulation unit 2040 performs a frequency shift in addition to the intensity modulation on the optical carrier wave. Specifically, the modulation unit 2040 sets the transmission light in a period in which a pulse is ON to an optical signal having a frequency of fs=fc+fm1 acquired by shifting a frequency of the optical carrier wave from fc by fm1, and sets intensity of the transmission light in a period in which the pulse is OFF to 0.

The first beat signal generation unit 2100 performs the heterodyne reception by causing the transmission light to interfere with reference light, and outputs a first digital beat signal. The second beat signal generation unit 2120 performs the heterodyne reception by causing reflected light to interfere with the reference light, and outputs a second digital beat signal. The optical carrier wave or local light corresponding to the optical carrier wave is used as the reference light.

Figure 10:
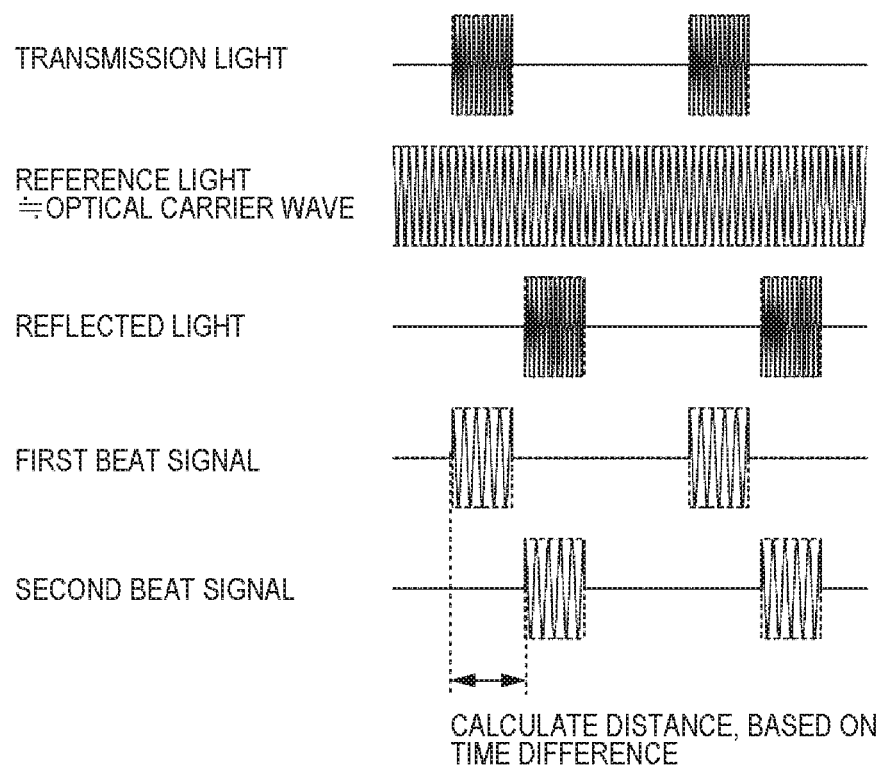
FIG. 10 is a diagram schematically illustrating transmission light, reference light, reflected light, and digital beat signals in the ToF method of performing intensity modulation.

FIG. 10 is a diagram schematically illustrating transmission light, reference light, reflected light, and digital beat signals in the ToF method of performing intensity modulation. The first digital beat signal is a signal having intensity of 0 in a period in which intensity of the transmission light is 0, and having a frequency of fs−fc (=fm1) in a period in which intensity of the transmission light is not 0. Thus, the calculation unit 2140 can easily specify the period in which the intensity of the transmission light is not 0. Similarly, the second digital beat signal is a signal having intensity of 0 in the period in which intensity of the reflected light is 0, and having a frequency of fs−fc (=Δfs) in a period in which the intensity of the reflected light is not 0. Thus, the calculation unit 2140 can easily specify the period in which the intensity of the reflected light is not 0.

Herein, the reflected light results from the transmission light being delayed according to a distance from the distance measurement device 2000 to the measured object 10. Thus, a time lag between the period in which the intensity of the first digital beat signal is not 0 and the period in which intensity of the second digital beat signal is not 0 coincides with time required for light to make a round-trip between the distance measurement device 2000 and the measured object 10. Thus, the calculation unit 2140 calculates the time lag, and calculates a distance from the distance measurement device 2000 to the measured object 10, based on the calculated time lag.

<<Case of Modulating Frequency>>

Figure 11:
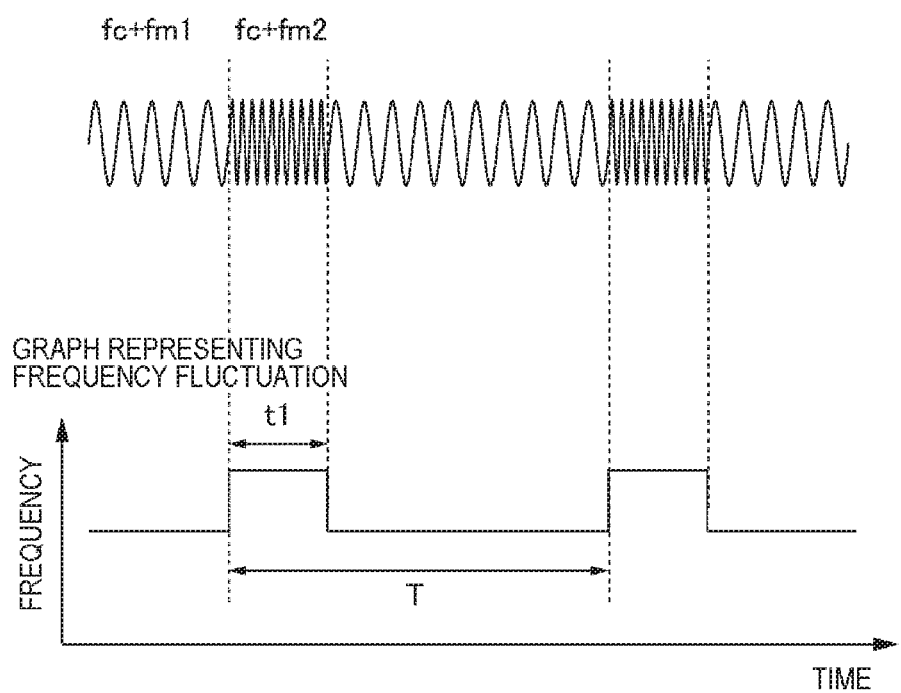
FIG. 11 is a diagram schematically illustrating a method of modulating a frequency of an optical carrier wave in the ToF method.

FIG. 11 is a diagram schematically illustrating a method of modulating a frequency of an optical carrier wave in the ToF method. An upper row illustrates transmission light, and a lower row illustrates a state of a change in frequency of the transmission light. Herein, it is assumed that the optical carrier wave is a sinusoidal wave having a frequency of fc. As illustrated, the transmission light in the ToF method using frequency modulation is a pulse signal having a pulse width of t1 and a cycle of T, but the transmission light is a signal having a frequency of light changed into a pulse shape in contrast to FIG. 9. Herein, similarly, for the heterodyne reception, the modulation unit 2040 performs frequency modulation on the optical carrier wave. Specifically, the modulation unit 2040 shifts a frequency of the optical carrier wave to fc+fm1 in a period in which a pulse is ON, shifts a frequency of the optical carrier wave to fc+fm2 in a period in which the pulse is OFF, and thus generates the transmission light.

The first beat signal generation unit 2100 performs the heterodyne reception by causing the transmission light to interfere with reference light, and outputs a first digital beat signal. Similarly, the second beat signal generation unit 2120 performs the heterodyne reception by causing reflected light to interfere with the reference light, and outputs a second digital beat signal. The optical carrier wave or local light corresponding to the optical carrier wave is used as the reference light.

Figure 12:
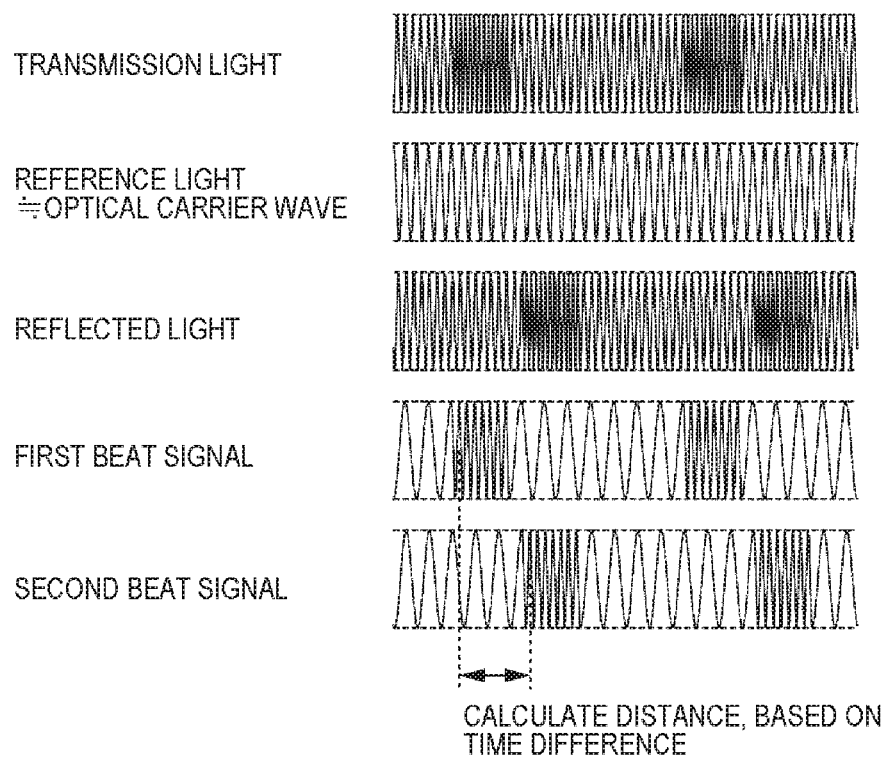
FIG. 12 is a diagram schematically illustrating transmission light, reference light, reflected light, and digital beat signals in the ToF method of performing frequency modulation.

FIG. 12 is a diagram schematically illustrating transmission light, reference light, reflected light, and digital beat signals in the ToF method of performing frequency modulation. The first digital beat signal in a period in which a frequency of the transmission light is fc+fm1 is a signal having a frequency of fm1. On the other hand, the first digital beat signal in a period in which a frequency of the transmission light is fc+fm2 is a signal having a frequency of fm2. The calculation unit 2140 detects timing at which a frequency of the first digital beat signal is switched, by analyzing the first digital beat signal. Similar processing is also performed on the second digital beat signal.

The reflected light results from the transmission light being delayed according to a distance from the distance measurement device 2000 to the measured object 10. Thus, a time lag between the period in which the frequency of the transmission light is fc+fm1 and the period in which the frequency of the reflected light is fc+fm1 coincides with time required for light to make a round-trip between the distance measurement device 2000 and the measured object 10. Thus, the calculation unit 2140 calculates the time lag, and calculates a distance from the distance measurement device 2000 to the measured object 10, based on the calculated time lag.

Herein, when the frequency fs is increased, a difference between the first digital beat signal in the period in which the frequency of the transmission light is fc and the first digital beat signal in the period in which the frequency of the transmission light is fs increases, and a boundary between the periods is more easily detected. The same also applies to the second digital beat signal. A suitable value of the frequency fs can be determined by performing a testing operation on the distance measurement device 2000 in advance, for example.

<<Case of Modulating Phase>>

Figure 13:
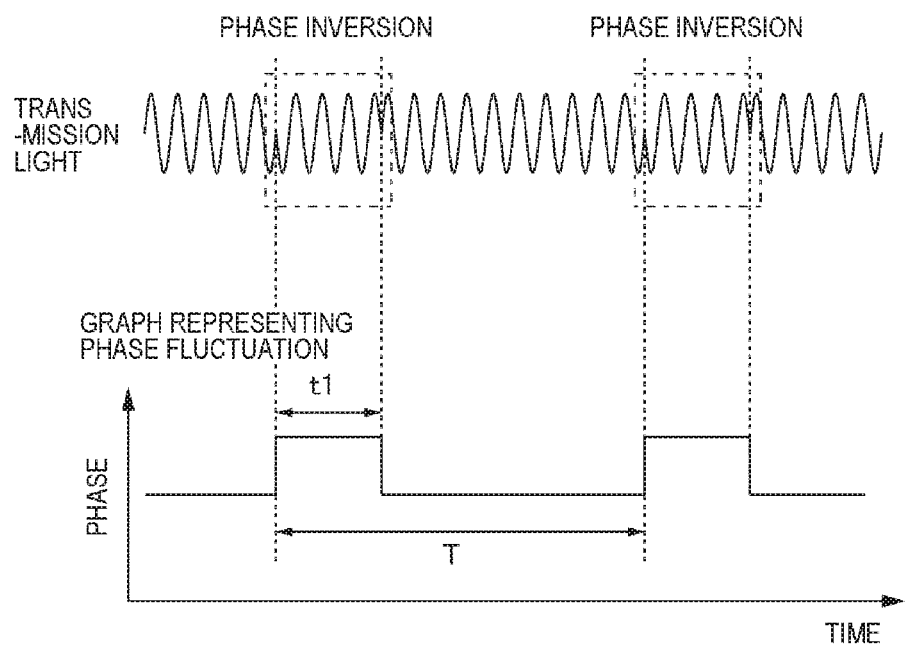
FIG. 13 is a diagram schematically illustrating a method of modulating a phase of an optical carrier wave in the ToF method.

FIG. 13 is a diagram schematically illustrating a method of modulating a phase of an optical carrier wave in the ToF method. An upper row illustrates transmission light, and a lower row illustrates a state of a change in phase of the transmission light. Herein, it is assumed that the optical carrier wave is a sinusoidal wave having a frequency of fc. As illustrated, the transmission light in the ToF method using phase modulation is a pulse signal having a pulse width of t1 and a cycle of T, but the transmission light is a signal having a phase of light changed into a pulse shape in contrast to FIGS. 9 and 11. The modulation unit 2040 performs the phase modulation on the optical carrier wave. Specifically, the modulation unit 2040 generates, as transmission light, an optical signal acquired by inverting a phase of the optical carrier wave 180 degrees in the period in which a pulse in a distance measurement signal is ON. Further, a frequency shift is also performed for the heterodyne reception.

Figure 14:
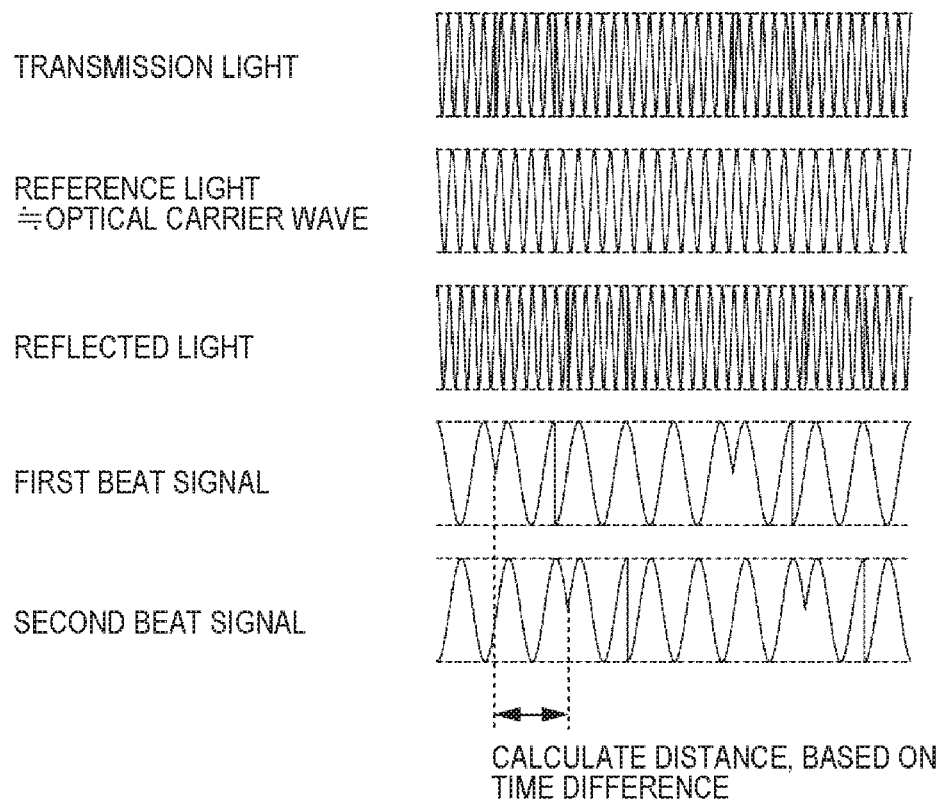
FIG. 14 is a diagram schematically illustrating transmission light, reference light, reflected light, and digital beat signals in the ToF method of performing phase modulation.

FIG. 14 is a diagram schematically illustrating transmission light, reference light, reflected light, and digital beat signals in the ToF method of performing phase modulation. The optical carrier wave or local light corresponding to the optical carrier wave is used as the reference light.

The calculation unit 2140 detects timing at which a phase of the first digital beat signal is switched, by analyzing the first digital beat signal. Similar processing is also performed on the second digital beat signal.

As described above, the reflected light results from the transmission light being delayed according to a distance from the distance measurement device 2000 to the measured object 10. Thus, a time lag between the period in which the phase of the transmission light is modulated and the period in which the phase of the reflected light is modulated coincides with time required for light to make a round-trip between the distance measurement device 2000 and the measured object 10. Thus, the calculation unit 2140 calculates the time lag, and calculates a distance from the distance measurement device 2000 to the measured object 10, based on the calculated time lag.

<Output of Result>

An output destination of a measurement distance calculated by the calculation unit 2140 varies. For example, the calculation unit 2140 stores a calculated measurement distance in a predetermined storage device. In addition, for example, the calculation unit 2140 displays a calculated measurement distance on a display device connected to the distance measurement device 2000. In addition, for example, the calculation unit 2140 may output a calculated measurement distance to another computer (such as a PC, a server device, or a portable terminal).

Note that, when transmission light having the same pattern repeated is used, the calculation unit 2140 can calculate one measurement distance for each pattern. Thus, the calculation unit 2140 may be configured to calculate a statistic of measurement distances calculated from a plurality of patterns in a predetermined period (for example, one second), and output the statistic as a calculation result. For example, the statistic is an average value and the like.

While the example embodiments of the present invention have been described with reference to the drawings, the example embodiments are only exemplification of the present invention, and various configurations other than the above-described example embodiments can also be employed.

The invention claimed is:

1. A distance measurement device, comprising:
   a modulation unit for generating transmission light by modulating an optical carrier wave;
   a transmission unit for transmitting the generated transmission light;
   a reception unit for receiving reflected light being light acquired by the transmission light being reflected by a measured object;
   a first beat signal generation unit for generating a first beat signal by causing the transmission light to interfere with reference light;
   a second beat signal generation unit for generating a second beat signal by causing the reflected light to interfere with the reference light; and
   a calculation unit for calculating a distance to the measured object, based on a difference between the first beat signal and the second beat signal, wherein
   the modulation unit generates transmission light by shifting a frequency of the optical carrier wave,
   the calculation unit specifies a phase difference between the transmission light and the reflected light from a difference between the first beat signal and the second beat signal, and calculates a distance to the measured object, based on the specified phase difference, and
   a frequency of the reference light is the frequency of the optical carrier wave.

2. The distance measurement device according to claim 1, wherein the reference light is the optical carrier wave or local light being output from a light source different from a light source of the optical carrier wave.

3. The distance measurement device according to claim 1, wherein the modulation unit modulates a frequency of the optical carrier wave by quadrature modulation.

4. A control method executed by a computer comprising:
   generating transmission light by modulating an optical carrier wave;
   transmitting the generated transmission light;
   receiving reflected light being light acquired by the transmission light being reflected by a measured object;
   generating a first beat signal by causing the transmission light to interfere with reference light;
   generating a second beat signal by causing the reflected light to interfere with the reference light; and
   calculating a distance to the measured object, based on a difference between the first beat signal and the second beat signal, wherein
   in generating transmission light, generating transmission light by shifting a frequency of the optical carrier wave; and,
   in calculating the distance, specifying a phase difference between the transmission light and the reflected light from a difference between the first beat signal and the second beat signal, and calculating a distance to the measured object, based on the specified phase difference, and
   a frequency of the reference light is the frequency of the optical carrier wave.

5. The control method according to claim 4, wherein the reference light is the optical carrier wave or local light being output from a light source different from a light source of the optical carrier wave.

6. The control method according to claim 4, further comprising, in generating transmission light, modulating a frequency of the optical carrier wave by quadrature modulation.

* * * * *